United States Patent
Sliney

[11] 3,788,579
[45] Jan. 29, 1974

[54] AIRCRAFT CONTROL SYSTEM USING INERTIALLY SENSED DATA

[75] Inventor: John T. Sliney, Hackensack, N.J.

[73] Assignee: The Bendix Corporation, Teterboro, N.J.

[22] Filed: Mar. 10, 1972

[21] Appl. No.: 233,522

[52] U.S. Cl...... 244/77 A, 235/150.22, 235/150.26, 244/77 B
[51] Int. Cl. .......................................... B64c 13/20
[58] Field of Search ................235/150.22, 150.26; 244/77 A, 77 B, 77 C; 318/583, 585; 343/5 LS, 107, 108 R

[56] References Cited
UNITED STATES PATENTS

| | | | |
|---|---|---|---|
| 3,635,428 | 1/1972 | Nelson et al. | 244/77 A |
| 3,057,584 | 10/1962 | Bretol | 244/77 S |
| 3,358,948 | 12/1967 | Sims | 244/77 A |
| 3,652,835 | 3/1972 | Devlin et al. | 244/77 A X |
| 3,099,007 | 7/1963 | Kittrell | 244/77 A X |
| 3,110,458 | 11/1963 | Bishop | 244/77 A |
| 3,361,392 | 1/1968 | Doniger et al. | 244/77 A |
| 3,417,945 | 12/1968 | Reynolds et al. | 244/77 A |
| 3,550,128 | 12/1970 | Pollack | 244/77 A X |

Primary Examiner—Duane A. Reger
Assistant Examiner—Stephen G. Kunin
Attorney, Agent, or Firm—Anthony F. Cuoco; S. H. Hartz

[57] ABSTRACT

A system using signals available from an on-board inertial platform for controlling an aircraft through an autopilot or flight director during localizer beam capture, tracking and runway alignment modes of flight. Localizer damping is provided as a function of inertial drift angle, i. e., the angle between the heading and instantaneous ground track of the craft.

5 Claims, 7 Drawing Figures

LATERAL LANDING GEOMETRY

AIRCRAFT CONTROL SYSTEM USING INERTIALLY SENSED DATA

BACKGROUND OF THE INVENTION

1. Field of the Invention

This invention relates generally to aircraft control systems and particularly to systems for controlling the craft when landing. More particularly, this invention relates to systems using inertially sensed data to augment instrument landing system (ILS) control.

2. Description of the Prior Art

A localizer radio beam error signal is utilized in aircraft control systems for commanding a proportional bank angle to correct the craft's position relative to the centerline of the beam. Although theoretically fixed in space, the beam is actually distorted by variations in terrain and reflections from ground vehicles and overflying aircraft. Since the aircraft control loop forces the craft to minimize lateral offsets sensed by the on-board radio receiver, it is desirable that the craft respond to beam irregularities only on a long term basis.

Some degree of lead, or beam rate, is required regardless of beam quality to damp the sinusoidal tracking that results from a proportional loop alone. Heretofore, damping has been provided, in part, by processing a beam error signal through a bandpass filter to approximate pure differentiation of the beam error signal within some band or interest. The bandpass must be narrow and the beam error signal must be limited to prevent aircraft response to high frequency noise and beam irregularities.

Because of the practical limitations on a beam rate signal so derived, other measures of beam rate are utilized. Preset course or heading error signals are normally employed as a measure of beam rate since changes in heading are proportional to velocity across the beam centerline under zero or constant crosswind conditions. The course signal is generally updated or "washed out" on a long term basis to allow for any steady state crab angle required to track the beam under crosswind conditions. The washout, if operative during the beam capture mode of flight, generally results in overshoot of the beam centerline, with the time to return to the centerline being dependent on beam error signal gain in the system. If operation of the washout is delayed until the beam error signal is reduced to some predetermined threshold, crosswind conditions could arise that would prevent attaining this threshold value and result in flight parallel to the beam centerline.

In addition to the aforenoted problems associated with washing out the course signal, this signal has certain drawbacks in the case of turbulence and wind shear. Under these conditions the aircraft has a natural tendency to "weathercock" or yaw into the relative wind, momentarily in response to gusts or uniformly in the case of wind shear. The course signal inhibits the weathercocking and allows the aircraft to accelerate laterally from its track.

In order to allow for weathercocking, come control systems replace most of the course signal with a "lagged roll" or pseudo heading signal once the aircraft is stabilized on track. A long term lag filter approximates the integral of roll attitude which is proportional to heading changes resulting from bank but does not reflect those changes caused by weathercocking or sideslip. The lagged roll signal provides the desired beam rate damping while allowing the aircraft to weathercock in response to gusts and shear. The drawback to this signal is that long term oscillations may result from the associated filtering not being a pure integration. Depending on the tightness of system gains, these oscillations may acquire amplitudes undesirable for automatic performance, and may be likewise unnacceptable for flight director operation.

In the present invention the aforenoted disadvantages are alleviated by generating the beam rate term required for system damping as a function of cross track angle which is the sum of preset course and drift angles.

SUMMARY OF THE INVENTION

This invention contemplates an aircraft control system responsive to beam error, heading error and inertial drift angle signals. During localizer beam capture and tracking modes of flight the heading error and drift angle signals are combined and the gain of the combined signal is adjusted. The gain of the beam error signal is adjusted and the gain adjusted signals are combined to operate either an autopilot or flight director system. Under autopilot operation, the gain adjusted beam error signal is integrated to cancel out bias or drift errors in the aircraft compass system or inertial platform during the tracking mode. Under flight director operation, the integration is replaced by filtering the combined heading error and drift angle signal.

During the runway alignment mode of flight, the gain of the beam error and drift angle signals is adjusted and the gain adjusted signals are combined with a steady state command signal for operating the autopilot or flight director.

One object of this invention is to provide a system for controlling an aircraft during landing.

Another object of this invention is to provide a system for controlling an aircraft during localizer beam capture, tracking and runway alignment modes of flight and utilizing sensed inertial data for localizer damping.

Another object of this invention is to provide localizer damping through a cross track angle signal which is a summation of preset source and drift angle signals, wherein the drift angle is inertially sensed and is the angle between the ground track and heading of the craft.

Another object of this invention is to replace derived beam rate and lagged roll terms with a crosstrack angle term to provide improved performance in localizer capture, tracking and runway alignment modes of flight under conditions of turbulence and wind shear.

Another object of this invention is to provide the crosstrack signal as a true inertial reference for tying the aircraft to the extended runway centerline regardless of localizer beam irregularities in space.

Another object of this invention is to provide optimum signal gain independent of adverse noise conditions.

Another object of this invention is to provide a system of the type described which is compatible with present automatic flight control system control loops utilizing signals commonly available from inertial navigation systems.

Another object of this invention is to provide a system of the type described which is adaptable to autopilot or flight director operation.

Another object of this invention is to provide a system of the type described which operates without gain switching during transition from localizer beam capture to tracking modes of flight so as to preclude problems associated with transient signals.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposed only and are not to be construed as defining the limits of the invention.

DESCRIPTION OF THE INVENTION

Figure 1:
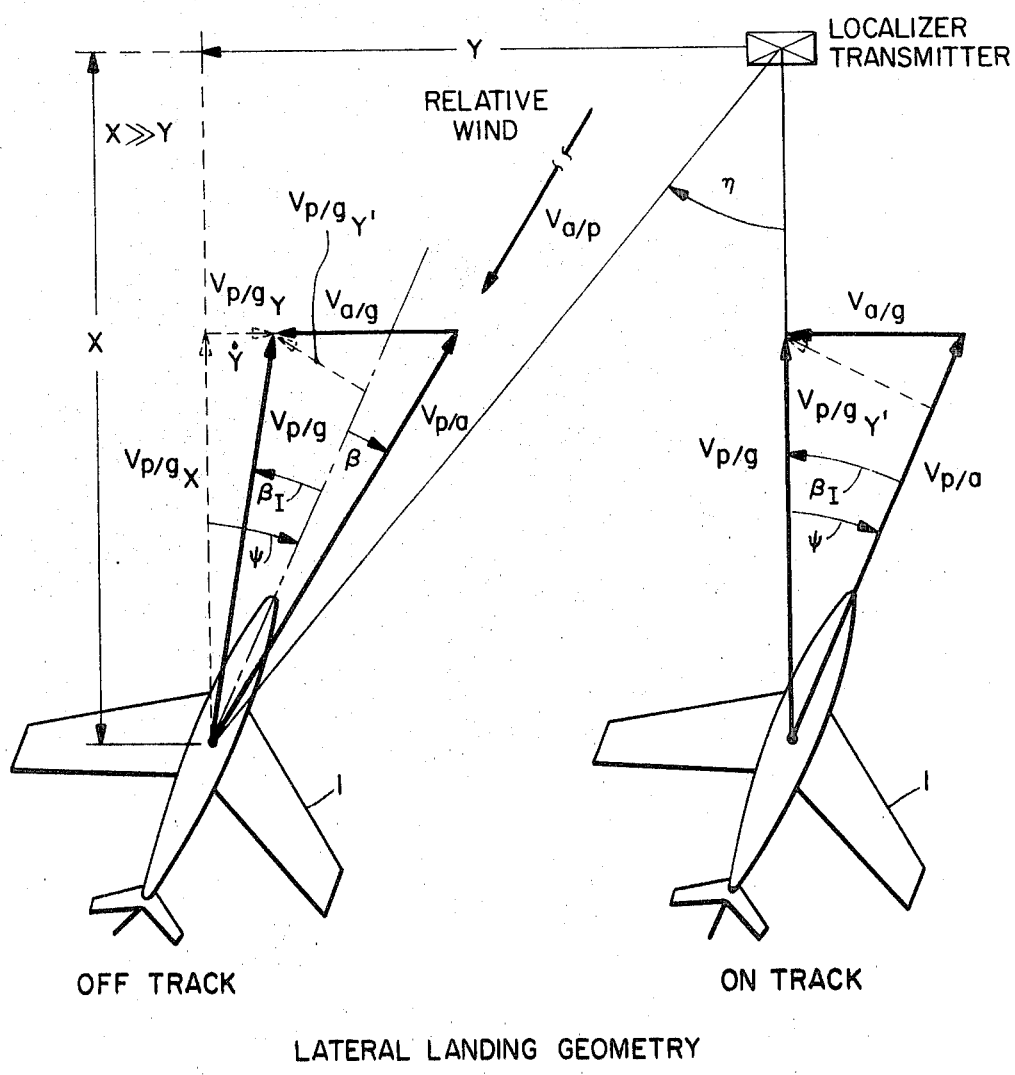
FIG. 1 is a diagrammatic representation showing lateral aircraft landing geometry and including the parameters incorporated in the invention.

The geometry associated with the lateral flight of an aircraft 1 when landing is shown in FIG. 1. The total velocity vectors with respect to the ground and the air mass carry the subscript $p$, $g$, and $a$ referring to aircraft, ground and air mass respectively. The components of these vectors resolved along runway coordinates carry the subscript $x$ and $y$ and the components resolved along the aircraft axes carry the subscripts $x'$ and $y'$. The definitions of the parameters shown in FIG. 1 are as follows:

$V_{p/a}$ — Total velocity of aircraft with respect to air mass $V_{a/p}$ — Total velocity of air mass with respect to aircraft $V_{a/g}$ — Total velocity of air mass with respect to ground $V_{p/g}$ — Total velocity of aircraft with respect to ground $V_{p/g_x}$ — Component of $V_{p/g}$ along the runway centerline $V_{p/g_y}$ — Component $V_{p/g}$ perpendicular to the aircraft centerline, positive to the right Y — Distance from aricraft c.g. to extended runway centerline X — Distance from aircraft c.g. to localizer transmitter $\eta$ — Angular error from beam centerline (beam error), positive when craft is right of centerline $\psi$ — Present course error, or difference between aircraft heading and runway heading, positive when the nose is to the right of the runway (heading error)

$\beta$ — Sideslip angle or angle of relative wind $\beta_I$ — Drift angle between ground track and aircraft heading; positive when the craft is drifting to the right. In terms of velocity vectors, $\sin B = V_{p/g_y}/V_{p/g}$.

$\psi+\beta_I$ — Crosstrack angle or angle of ground track relative to runway heading $\phi$ — Roll attitude, positive for right wing down In accordance with the relationships shown in FIG. 1 the following analysis may be made:

$$\dot{Y} = V_{p/g} \sin(\psi+\beta_I) \tag{1}$$

For the small crosstrack angles encountered during localizer tracking, the relationship may be approximated by:

$$\dot{Y} = V_{p/g}\,\psi + \beta_I/57.3; \tag{2}$$

where $(\psi+\beta_I)$ is expressed in degrees. Thus, for a constant groundspeed on approach, $(\psi+\approx_I)$ is effectively crosstrack velocity or desensitized beam rate. For an assumed approach groundspeed of 135 knots or 229 feet per second, one degree of crosstrack angle corresponds to 4 feet per second velocity across the beam centerline. A proposed gain of 1.6° bank per degree crosstrack angle is approximately 0.4° bank per foot per second $\dot{Y}$. Any change in groundspeed during approach may be considered as affecting small variations in system gain and does not result in a discrepancy in the concepts involved.

The relation between beam error in degrees and linear lateral deviation is, from FIG. 1:

$$\lambda \approx 57.3\,Y/X \tag{3}$$

At a range of approximately 29,000 feet at which a gain schedule is initiated, the proposed gain corresponds to 200° bank per degree per second beam rate. Assuming perfect desentization of the localizer beam error via gain scheduling, the signal strength of the crosstrack angle term is analogous to beam rate derived from the desensitized beam error signal.

The crosstrack angle term in the disclosed configuration replaces the filter derived beam rate and lagged roll terms and eliminates the need for a separate heading loop. The crosstrack angle term is zero whenever the aircraft is tracking the beam centerline regardless of crosswind since the crab and drift angles cancel in the computation. Unlike a pure heading term, the crosstrack angle term allows the craft to weathercock instantaneously in response to gusts and shear.

Although relatively noise free, the crosstrack angle term may be subjected to bias or drift errors originating in the compass system or inertial platform. When the automatic pilot system is engaged these errors are cancelled by a beam error integrator once the aircraft is in the localizer tracking mode of flight. During flight director operation, steady state integration of beam error may be replaced by a washout of crosstrack angle ($\dot{Y}$). Switching problems associated with a washout or a preset course error term alone do not arise since the capability exists for asymptotic beam captures under wind conditions prior to engagement of the washout function. Since the washout is designed only to remove steady offsets in the corsstrack reference and is not a requirement for steady s tate crab in cross winds, a longer time consant may be tolerated than in the conventional system.

Once the aircraft is stabilized on track, the crosstrack term is sensitive to motion across an inertial reference line in space rather than across the instantaneous beam centerline as is the case with a filter derived term. As a result, the aircraft is permitted lateral motion only on a long term basis, with heavy damping in response to beam noise and ambiguities.

During crosswind condition, an additional maneuver is required prior to touchdown to zero the aircraft heading relative to the runway and to insure minimum side loading on the landing gear at impact. With the crab angle removed, wind forces will accelerate the aircraft laterally unless the precise amount of opposing bank angle is maintained. Since the drift angle term measures the component of groundspeed across the aircraft centerline, it is a measure of side force on the landing gear at touchdown. If it is desired to maintain heading control through the aircraft rudder during the runway alignment maneuver, a drift angle term may be inserted in the aileron control chain to prevent lateral dispersions prior to touchdown. In general, an additional term will be required to provide steady state aileron and bank control for the slip maneuver. This term may be a crossfeed proportional to the steady state rudder required such as the integral of preset course, or it may be a term proportional to the original crab angle memorized on track. The purpose of the drift angle term is to provide short term crosstrack rate information to counteract drift, particularly in the presence of wind shear near the ground.

With the preceeding analysis in mind reference will be had to FIGS. 2–7.

Figure 2:
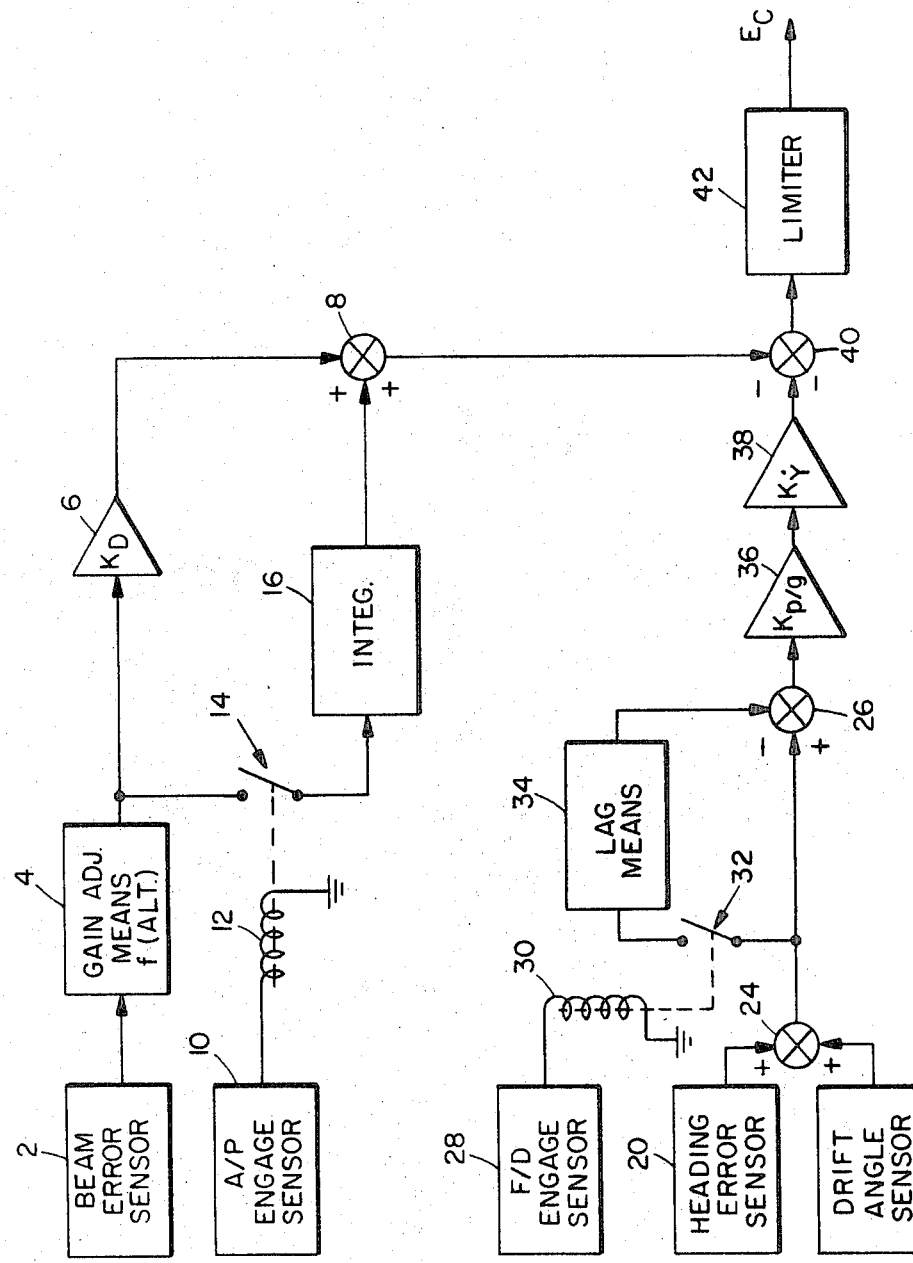
FIG. 2 is a block diagram of an aircraft control system according to the invention for controlling the craft in localizer capture and tracking modes of flight.

FIG. 2 shows an on-board beam error sensor 2 which provides a signal corresponding to the displacement of aircraft 1 from the localizer beam centerline. The beam error signal is applied to a gain adjustment means 4 which adjusts the gain of the beam error signal as a function of altitude or time, with altitude being shown by way of illustration.

The gain adjusted beam error signal is applied to an amplifier 6 having a constant gain factor $K_D$ and therefrom to a summing means 8.

An autopilot engage sensor 10 provides a signal when aircraft 1 is being controlled by the autopilot to track the localizer beam. The signal from autopilot engage sensor 10 energizes a relay 12 which closes a normally open switch 14.

The gain adjusted beam error signal from gain adjustment means 4 is applied through switch 14 to an integrator 16 and therefrom to summing means 8 which sums the integrator signal and the signal from gain adjustment means 6.

A on-board heading error sensor 20 provides a heading error signal and a drift angle sensor 22, which may be part of an on-board inertial platfrom, provides a drift angle signal which, as heretofore noted, corresponds to the difference between the ground track and the heading of aircraft 1. The heading error signal from sensor 20 and the drift angle signal from sensor 22 are applied to a summing means 24 which sums the signals. The resultant crosstrack angle signal is applied to a summing means 26.

A flight director engage sensor 28 provides a signal when the flight director is operating the aircraft for tracking the localizer beam. The signal from flight director 28 energizes a relay 30 which closes a normally open switch 32.

The signal from summing means 24 is applied through switch 32 to a lag means 34 which may be a conventional type low pass filter. The signal from lag means 34 is applied to summing means 26 and summed thereby with the signal from summing means 24.

The signal from summing means 26 is applied to an amplifier 36 having a constant gain factor $K_{p/g}$ which is a function of average groundspeed and the gain adjusted signal is applied to an amplifier 38 having a constant gain factor $K_Y$. The signal from amplifier 38 is applied to an inverting summing means 40 and summed thereby with the signal from summing means 8. The signal from summing means 40 is applied to a limiter 42 which provides a command signal $F_c$.

Thus, when the aircraft is in the beam capture mode of flight the heading error and drift angle signals are combined and the combined signal is gain adjusted via amplifiers 36 and 38 and combined with the beam error signal gain adjusted via means 4 and amplifier 6 to provide command signal $F_C$. During the tracking mode under flight director control, a filtered combined heading error and drift angle signal is combined with the unfiltered combined signal, and under autopilot control an integrated beam error signal gain adjusted via means 4 is combined with the unintegrated beam error signal gain adjusted via means 4 and amplifier 6. The integrated beam error signal cancels bias or drift errors in the compass system or inertial platfrom during autopilot control and is replaced by the filtered signal during flight director control.

Figure 3:
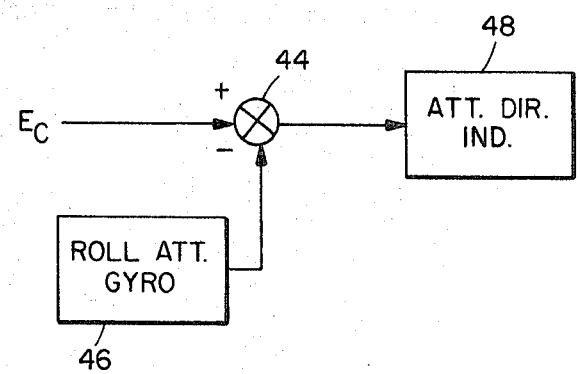
FIG. 3 is a block diagram showing the system of FIG. 2 adapted to flight director operation.

As shown in FIG. 3, command signal $E_C$ is applied to a summing means 44 and summed thereby with a signal from a roll attitude gyro 46. The signal from summing means 44 is applied to an attitude directional indicator 48 included in a flight director system.

Figure 4:
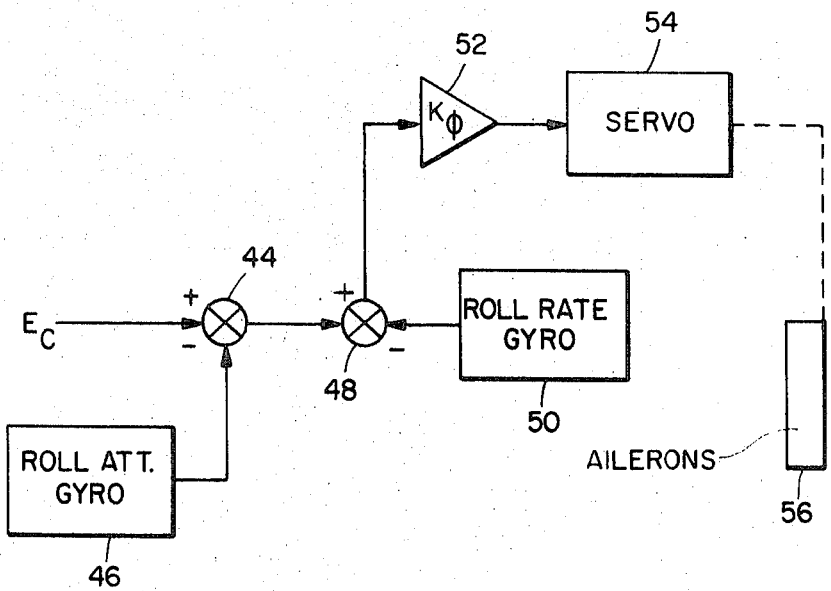
FIG. 4 is a block diagram showing the system of FIG. 2 adapted to autopilot operation.

As shown in FIG. 4, signal $E_C$ is applied to summing means 44 and summed thereby with the signal from roll attitude gyro 46. The signal from summing means 44 is applied to a summing means 48 and summed thereby with a signal from a roll rate gyro 50. The signal from summing means 48 is applied to an amplifier 52 having a constant gain factor $K_\phi$ and therefrom to an autopilot servo 54 for controlling ailerons 56 of aircraft 1.

Figure 5:
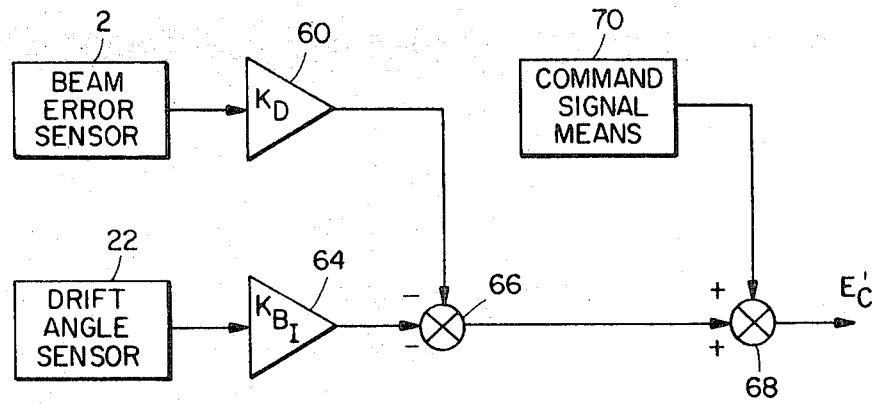
FIG. 5 is a block diagram showing an aircraft control system according to the invention for controlling the craft in the runway alignment mode of flight.

The implementation of the runway alignment mode of flight is shown in FIG. 5. Thus, the signal from beam error sensor 2 is applied to an amplifier 60 having the constant gain factor $K_D$ and the signal from drift angle sensor 22 is applied to an amplifier 64 having a constant gain factor $K_{B_I}$.

The signal from amplifier 60 and the signal from amplifier 64 are applied to an inverting summing means 66 which sums the signals. The signal from summing means 66 is applied to a summing means 68 and summed thereby with a steady state command signal from a command signal means 70 to provide a command signal $E_C'$.

Figure 6:
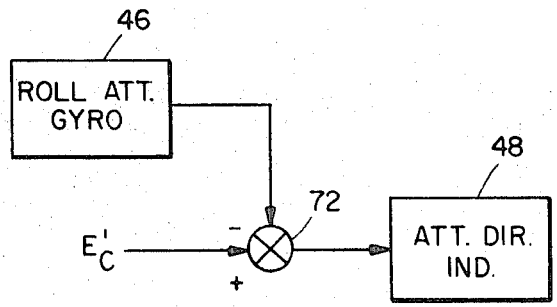
FIG. 6 is a block diagram showing the system of FIG. 5 adapted to flight director operation.

As shown in FIG. 6, signal $E_C'$ is applied to a summing means 72 and summed thereby with the signal from roll attitude gyro 46. The signal from summing means 72 is applied to attitude directional indicator 48 which is part of the flight director system as heretofore noted.

Figure 7:
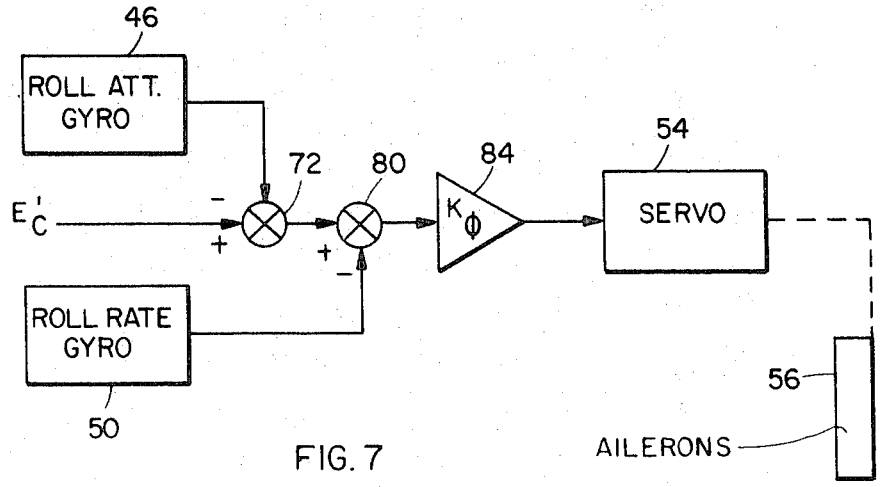
FIG. 7 is a block diagram showing the system of FIG. 5 adapted to autopilot operation.

As shown in FIG. 7, the signal from roll attitude gyro 46 is summed with signal $E_c'$ by summing means 72. The signal from summing means 72 is applied to a summing means 80 and summed thereby with the signal from roll rate gyro 50. The signal from summing means 80 is applied to an amplifier 84 having the constant gain factor $K_\phi$ and therefrom to autopilot servo 54 which controls ailerons 56 of aircraft 1.

It will now be seen that the aforenoted objects have been met and the disclosed invention has an advantage over conventional systems in that it is applicable to flight director or pilot-in-the-loop systems. By eliminating the need for lagged rool and derived beam rate, command signals presented to the pilot via an attitude-direction indicator are virtually free from spurious or false commands. This feature provides the capability, for example, of manual capture of the localizer beam followed by engagement of the autopilot system.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An aircraft control system having selectively engaged flight director and autopilot means, comprising:
    means for providing a beam error signal;
    means for providing a heading error signal;
    means for providing a drift angle signal;
    means for adjusting the gain of the beam error signal;
    means for adjusting the gain of the gain adjusted signal;
    means for providing a signal when the autopilot is engaged for controlling the craft;
    an integrator;
    a first normally open switch connected to the integrator and connected intermediate the first and second mentioned gain adjusting means;
    means connected to the autopilot engage signal means and to the switch and responsive to the engage signal for closing the switch to apply the gain adjusted beam error signal to the integrator;
    first combining means for combining the signals from the second mentioned gain adjusting means and the integrator;
    second combining means for combining the heading error and drift angle signals;
    a filter;
    a second normally open switch connected to the second combining means and to the filter;
    means for providing a signal when the flight director is engaged for controlling the craft;
    means connected to said engage signal means and to the switch for closing the switch to apply the signal from the second combining means to the filter;
    third combining means for combining the filter signal and the signal from the second combining means;
    means for adjusting the gain of the signal from the third combining means;
    fourth combining means for combining said gain adjusted signal and the signal from the first combining means;
    means for limiting the signal from the fourth combining means to provide a first command signal;
    other means for adjusting the gain of the beam error signal;
    means for adjusting the gain of the drift angle signal;
    fifth combining means for combining said gain adjusted signals;
    means for providing a steady state command signal;
    sixth combining means for combining the steady state command signal and the signal from the fifth combining means to provide a second command signal and
    means connected to the first and second command signal means for utilizing the signals therefrom to control the craft.

2. An aircraft control system as described by claim 1, wherein the utilizing means includes:
    means for providing a roll attitude signal;
    means for combining the roll attitude and first command signals; and
    means connected to the combining means and responsive to the signal therefrom for indicating the attitude and direction of the craft.

3. An aircraft control system as described by claim 11, wherein the utilizing means includes:
    means for providing a roll attitude signal;
    means for combining the roll atitutde and first command signals;
    means for providing a roll rate signal;
    means for combining the combined roll attitude and command signal and the roll rate signal;
    an aircraft control surface; and
    means connected to the last mentioned combining means and to the control surface for operating said surface in response to the combined signal.

4. An aircraft control system as described by claim 1, wherein the utilizing means includes:
    means for providing a roll attitude signal;
    means for combining the roll attitude and second command signals; and
    means connected to the combining means and responsive to the signal therefrom for indicating the attitude and direction of the craft.

5. An aircraft control system as described by claim 1, wherein the utilizing means includes:
    means for providing a roll attitude signal;
    means for combining the roll attitude and second command signals;
    means for providing a roll rate signal;
    means for combining the combined roll attitude and second command signal and the roll rate signal;
    an aircraft control surface; and
    means connected to the last mentioned combining means and to the control surface for operating said surface in response to the combined signal.

* * * * *

UNITED STATES PATENT OFFICE
CERTIFICATE OF CORRECTION

PATENT NO. : 3,788,579
DATED : January 29, 1974
INVENTOR(S) : JOHN T. SLINEY

It is certified that error appears in the above-identified patent and that said Letters Patent are hereby corrected as shown below:

In claim 3, line 29, the numeral "11" should be --1--.

Signed and sealed this 15th day of July 1975.

(SEAL)
Attest:

RUTH C. MASON
Attesting Officer

C. MARSHALL DANN
Commissioner of Patents
and Trademarks